C. WOLF.
FURNACE FOR HEATING WATER AND GENERATING STEAM.
APPLICATION FILED FEB. 15, 1915.

1,164,151.

Patented Dec. 14, 1915
2 SHEETS—SHEET 1.

C. WOLF.
FURNACE FOR HEATING WATER AND GENERATING STEAM.
APPLICATION FILED FEB. 15, 1915.

1,164,151.

Patented Dec. 14, 1915.
2 SHEETS—SHEET 2.

Witnesses:
B. Sommers
E. Leckert

Inventor
Carl Wolf
By Henry ...
atty.

UNITED STATES PATENT OFFICE.

CARL WOLF, OF SCHWEINSBURG-ON-THE-PLEISSE, GERMANY.

FURNACE FOR HEATING WATER AND GENERATING STEAM.

1,164,151.  Specification of Letters Patent.  Patented Dec. 14, 1915.

Application filed February 15, 1915. Serial No. 8,399.

*To all whom it may concern:*

Be it known that I, CARL WOLF, manufacturer, a citizen of Germany, residing at Schweinsburg-on-the-Pleisse, Germany, have invented certain new and useful Improvements in Furnaces for Heating Water and Generating Steam, of which the following is a full, clear, and exact description, reference being had to the accompanying drawings, forming part of this specification.

The invention relates to that class of furnaces which are provided with several vertical water chambers inclosing fuel chambers. These fuel chambers can be fed with fuel independently one of the other and above these fuel chambers a common horizontal water or steam chamber is provided, connected with the vertical water chambers.

The object of my invention is to construct the flues of such a furnace in such a manner, that cheap fuel such as brown-coal-briquets can be used with advantage. For this purpose two flues are arranged in such a manner, that the fire gases of the fuel chambers can enter into each of the flues with the result that the gases of the several fuel chambers are mixed together, so that a perfect combustion is obtained.

Figure 1:
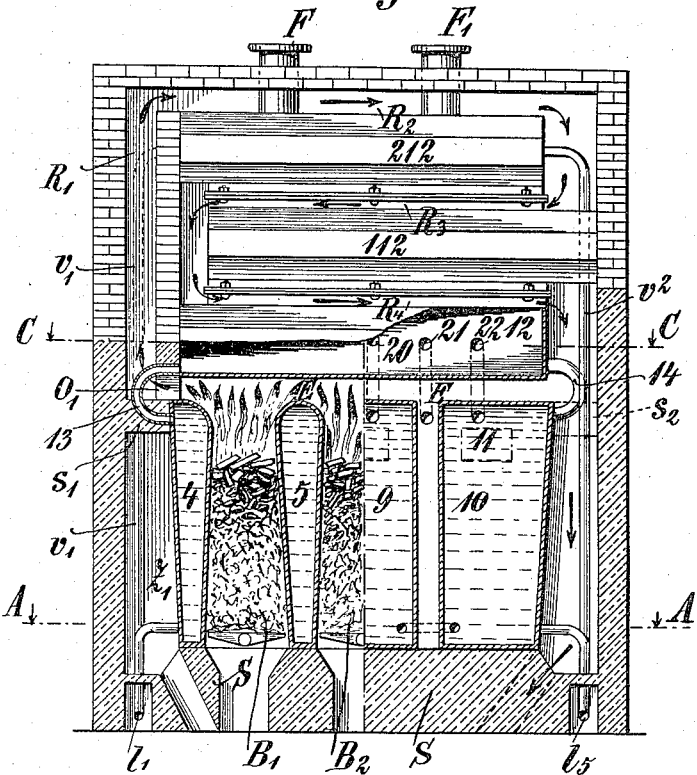
Figure 2:
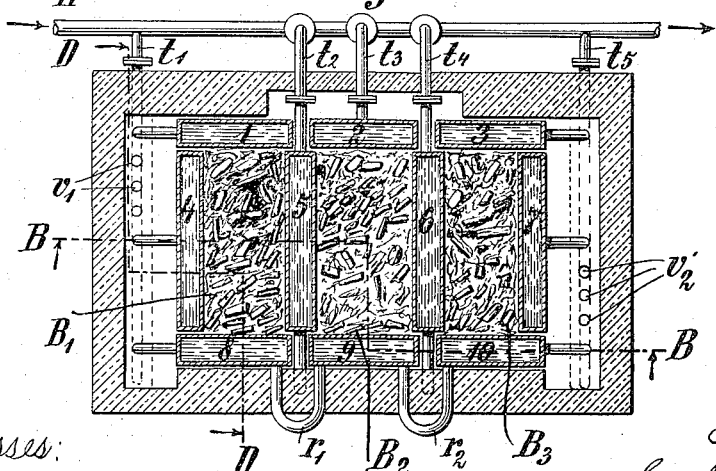
Figure 3:
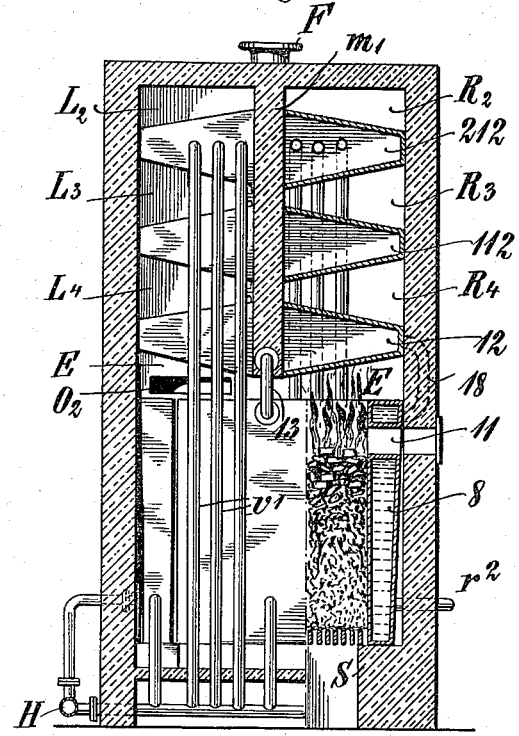
Figure 4:
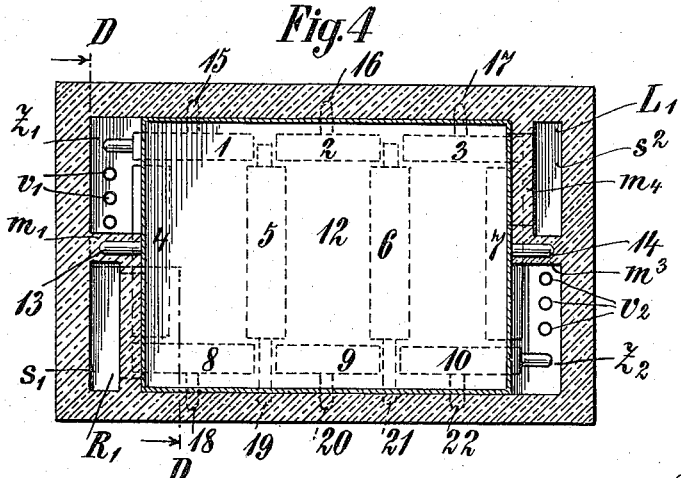

In the accompanying drawings Figure 1 is a vertical longitudinal section through the furnace on line B—B of Fig. 2. Fig. 2 is a horizontal section on line A—A— of Fig. 1. Fig. 3 is a vertical cross section on line D—D of Fig. 2. Fig. 4 is a horizontal section on line C—C of Fig. 1.

On the base S of the furnace are arranged the vertical water chambers 1, 2, 3, 4, 5, 6, 7, 8, 9 and 10, inclosing the fuel chambers $B_1$ $B_2$ $B_3$. The water chambers are fed with water by the main pipe H through the branches $t_1$ $t_2$ $t_3$ $t_4$ and $t_5$. The branch $t_1$ is connected with the water chambers 1, 4 and 8, and the branch $t_5$ with the chambers 3, 7 and 10. The branches $t_2$ and $t_4$ are connected with the inner water chambers 5 and 6 respectively, and the branch $t_3$ is connected with the chamber 2. By the pipe $r_1$ the chambers 8 and 9 are connected and by the pipe $r_2$ the chambers 9 and 10, so that all chambers are connected with each other. The front chambers 8, 9 and 10 are provided in the upper part with openings 11, through which the fuel can be fed to the chambers $B_1$ $B_2$ $B_3$. All water-chambers are connected with an upper common receiver 12. The water-chambers 4 and 7 are connected with the receiver 12 by the pipes 13 and 14, the back water chambers 1, 2 and 3 are connected with the receiver 12 by the pipes 15, 16 and 17, and the water chambers 8, 5, 9, 6 and 10 are connected with the said receiver by the pipes 18, 19, 20, 21 and 22. The receiver consists of several boxes 12, 112, 212, arranged one above the other and connected by suitable pipes or passages.

The common combustion chamber E, arranged above the fuel chambers $B_1$ $B_2$ $B_3$ is connected with two flues, beginning at opposite ends of the combustion chamber, one being arranged in the front part of the furnace, the other on the back part. These flues extend in opposite directions and are separated from each other by a vertical partition. The flue of the front part of the furnace is shown in Fig. 1. It begins with the rising channel $R_1$ which is connected at its lower end with the common combustion chamber E through the opening $O_1$. The upper end of this channel leads to the channel $R_2$ running from the left to the right hand above the box 212. This channel leads to the channel $R_3$ running in the opposite direction between the boxes 212 and 112, and $R_3$ leads to the channel $R_4$ running from the left to the right hand between the boxes 112 and 12 and terminating in the downward deliverey channel $Z_2$.

The flue of the back part of the furnace, running in the opposite direction begins with the channel $L_1$, on the right side of Fig. 4, which is connected at its lower end with the common combustion chamber E through the opening $O_2$. The upper end of this channel leads to the horizontal channels $L_2$ $L_3$ $L_4$, shown on the left side of Fig. 3, terminating in the downward delivery channel $Z_1$. The downward delivery channels $Z_1$ and $Z_2$ are of the breadth of the furnace. The front part of the delivery channel $Z_1$ is separated from the rising channel R, arranged in the upper part of the furnace, by a horizontal partition $s_1$ (Fig. 1). In the same manner the back part of the delivery channel $Z_2$ is separated from the rising channel $L_1$ by a horizontal partition.

The pipes $t_1$ and $t_5$ are connected with the upper box of the receiver by groups of heating pipes $v_1$ and $v_2$, arranged in the delivery channels $Z_1$ and $Z_2$ respectively. The box 212 is provided with two connection pipes F₁ and F₂ from which hot water may be drawn off or these pipes may be connected with a steam receiver.

The working of the furnace is as follows: If all water chambers 1 to 10 are filled with water, the fuel chambers B₁ B₂ B₃ are filled through the openings 11 with briquets, which are ignited from the top, so that they burn downward. The fire gases, produced in the fuel chambers are mixed in the upper combustion chamber E and pass to the flue R₁ or L₁ or to both of them. If the combustion is slower in one of the fuel chambers than in another one, the gases, produced by this slow combustion, will follow in the combustion chamber E the gases produced by the other chambers and become mixed with the same and burn without any addition of fresh air.

As there are several fuel chambers, independent one of the other, the furnace can be used with one or two chambers remaining unfilled. The ignition of the fuel, when the furnace is used, is effected in such a manner, that an empty fuel chamber is filled with briquets to such a height, that the briquets enter in the common combustion chamber E. The fire gases, produced in the other fuel chambers will then ignite these briquets, so that a special implement for igniting the briquets is not necessary.

Having fully described my invention, what I claim, and desire to secure by Letters Patent is—

1. A furnace comprising a plurality of vertical water chambers connected with each other and arranged to form independent fuel chambers, a combustion chamber common to the latter, flues extending from opposite sides of the combustion chamber, one of said flues being arranged in the front and the other in the back part of the furnace and constructed to cause the fire gases in the front and back flues to move in opposite directions.

2. A furnace comprising a plurality of vertical water chambers connected with each other and arranged to form independent fuel chambers, a combustion chamber common to the latter, and two flues separated from each other, each flue having a rising channel on one side of the furnace and a downward delivery channel on the other side of the furnace and one or more horizontal channels between the rising and the delivering channels.

3. A furnace comprising a plurality of vertical water chambers connected with each other and arranged to form independent fuel chambers, a combustion chamber common to the latter, two flues arranged in the upper part of the furnace and running in opposite directions, each flue separated from the other by a vertical partition having a rising channel on one side of the furnace and a downward delivery channel on the other side of the furnace, and one or more horizontal channels between the rising and the delivery channel.

In testimony whereof I have signed my name to this specification, in the presence of two subscribing witnesses.

CARL WOLF.

Witnesses:
  KURT HURXCY,
  MAN. PIETRANK.